United States Patent
Ito et al.

(10) Patent No.: US 11,118,020 B2
(45) Date of Patent: Sep. 14, 2021

(54) MASTERBATCH, RUBBER COMPOSITION, AND METHODS FOR PRODUCING THE SAME

(71) Applicant: NIPPON PAPER INDUSTRIES CO., LTD., Tokyo (JP)

(72) Inventors: Kotaro Ito, Tokyo (JP); Yusuke Yasukawa, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 161 days.

(21) Appl. No.: 16/063,884

(22) PCT Filed: Dec. 21, 2016

(86) PCT No.: PCT/JP2016/088242
§ 371 (c)(1),
(2) Date: Jun. 19, 2018

(87) PCT Pub. No.: WO2017/110944
PCT Pub. Date: Jun. 29, 2017

(65) Prior Publication Data
US 2018/0371182 A1 Dec. 27, 2018

(30) Foreign Application Priority Data
Dec. 25, 2015 (JP) .............................. JP2015-255051

(51) Int. Cl.
*C08J 3/22* (2006.01)
*C08L 21/00* (2006.01)
*C08B 11/12* (2006.01)
*C08K 7/02* (2006.01)
*C08B 15/04* (2006.01)
*C08L 1/02* (2006.01)

(52) U.S. Cl.
CPC ................ *C08J 3/22* (2013.01); *C08B 11/12* (2013.01); *C08B 15/04* (2013.01); *C08K 7/02* (2013.01); *C08L 1/02* (2013.01); *C08L 21/00* (2013.01); *C08J 2301/02* (2013.01); *C08J 2301/04* (2013.01); *C08J 2419/00* (2013.01); *C08L 2205/16* (2013.01); *C08L 2310/00* (2013.01)

(58) Field of Classification Search
CPC ...... C08J 3/22; C08J 2419/00; C08J 2301/04; C08J 2301/02; C08B 15/04; C08B 11/12; C08L 1/02; C08L 21/00; C08L 2310/00; C08L 2205/16; C08K 7/02
See application file for complete search history.

(56) References Cited

U.S. PATENT DOCUMENTS

| 2012/0009661 | A1 | 1/2012 | Miyawaki et al. | |
| 2014/0206798 | A1 | 7/2014 | Oomori et al. | |
| 2016/0009877 | A1* | 1/2016 | Takaoka etal. | C08J 5/045 524/575.5 |
| 2016/0340500 | A1* | 11/2016 | Miyazaki | C08J 3/005 |

FOREIGN PATENT DOCUMENTS

| CN | 102361915 A | 2/2012 |
| CN | 105143318 A | 12/2015 |
| JP | 2010-235687 A | 10/2010 |
| JP | 2013-18918 A | 1/2013 |
| JP | 2014-141637 A | 8/2014 |
| WO | WO 2010/134357 A1 | 11/2010 |
| WO | WO 2013/077354 A1 | 5/2013 |

OTHER PUBLICATIONS

Office Action dated Dec. 20, 2019 in Indian Patent Application No. 201847022795, 6 pages.
International Search Report dated Mar. 21, 2017, in PCT/JP2016/088242 filed Dec. 21, 2016.
Isogai, A., "Composite Materials of Tempo-Oxidized Cellulose Single Nanofiber", Journel of the Society of Rubber Industry, vol. 85, No. 12, 2012, pp. 388 to 393.
Combined Chinese Office Action and Search Report dated May 11, 2020, in Patent Application No. 201680074821.7, 12 pages (with unedited computer generated English translation).

* cited by examiner

*Primary Examiner* — Jessica M Roswell
(74) *Attorney, Agent, or Firm* — Oblon, McClelland, Maier & Neustadt, L.L.P.

(57) ABSTRACT

Disclosed herein is method for preparing a masterbatch by dispersing chemically modified cellulose nanofibers having carboxy groups under acidic conditions and then mixing the dispersed cellulose nanofibers with rubber latex. More specifically, the present disclosure provides a method for producing a masterbatch, including: (A) a step of introducing a carboxy group to a cellulose-based raw material to prepare a modified cellulose; (B) a step of carrying out defibration treatment and dispersion treatment of the modified cellulose to prepare a cellulose nanofiber; (C) a step of acidifying the cellulose nanofiber to prepare an acid type cellulose nanofiber; and (D) a step of mixing the acid type cellulose nanofiber and a rubber component. The rubber composition having excellent strength such as tensile strength can be provided by using the obtained masterbatch.

6 Claims, No Drawings

MASTERBATCH, RUBBER COMPOSITION, AND METHODS FOR PRODUCING THE SAME

FIELD

The present invention relates to a masterbatch, a rubber composition, and methods for producing the same. Specifically, the present invention relates to a masterbatch including cellulose nanofibers, a rubber composition, and methods for producing the same.

BACKGROUND

In recent years, a technique for improving various strengths such as tensile strength of a rubber composition by including a material produced by finely loosening plant fibers until nano level, which is called cellulose nanofibers, in the rubber composition has been known.

For example, Patent Literature 1 has described that rubber latex and the aqueous dispersion liquid of cellulose fibers having carboxy groups are mixed and thereafter a cellulose fiber/rubber composite can be obtained by removing at least a portion of water and a rubber composition having excellent hardness and tensile strength can be obtained by mixing this composite and a rubber.

CITATION LIST

Patent Literature

Patent Literature 1: Japanese Patent Application Laid-open No. 2013-018918

SUMMARY

Technical Problem

However, although the hardness and tensile strength of the rubber composition obtained by the method in Patent Literature 1 have been excellent, these properties have been not as sufficient as expected. As a cause, it is assumed that the cellulose fibers are not uniformly dispersed in the rubber composition due to the following reasons. When the rubber latex and the aqueous dispersion liquid of the cellulose fibers are mixed in order to obtain the rubber composition, the carboxy groups in the cellulose fibers form a salt such as a sodium salt and thus the cellulose fibers have a state of high hydrophilicity. Therefore, when the water is removed from the dispersion liquid, the carboxy groups may form a hydrogen bond with each other and the cellulose fibers are strongly aggregated. This may cause reduction in dispersibility. In other words, it is assumed that, although the cellulose nanofibers can achieve innate reinforcing properties when the cellulose nanofibers are uniformly dispersed in the system, the cellulose nanofibers cannot achieve innate reinforcing properties when the cellulose nanofibers are aggregated.

Consequently, an object of the present invention is to provide a masterbatch in which cellulose nanofibers are uniformly dispersed in a system and a rubber composition produced using the masterbatch and having excellent strength such as tensile strength.

Solution to Problem

As a result of extensive studies to solve the above problems, the inventors of the present invention have found that a rubber composition having high tensile strength can be obtained by preparing a masterbatch by sufficiently dispersing cellulose nanofibers containing carboxy groups under acidic conditions in advance and thereafter mixing the dispersed cellulose nanofibers with rubber latex and producing a rubber composition using this masterbatch.

That is, the present invention provides the following.

[1] A method for producing a masterbatch, the method comprising:
(A) a step of introducing a carboxy group to a cellulose-based raw material to prepare a modified cellulose;
(B) a step of carrying out defibration treatment and dispersion treatment of the modified cellulose to prepare a cellulose nanofiber;
(C) a step of acidifying the cellulose nanofiber to prepare an acid type cellulose nanofiber; and
(D) a step of mixing the acid type cellulose nanofiber and a rubber component.

[2] The method according to [1], wherein washing treatment is carried out after the acidification at the (C) step.

[3] The method according to [1] or [2], wherein the introduction of the carboxy group at the (A) step is an introduction of a carboxy group by oxidation or carboxymethylation.

[4] The method according to any one of [1] to [3], wherein the cellulose nanofiber is an oxidized cellulose nanofiber having an amount of carboxy groups of 0.5 mmol/g to 3.0 mmol/g relative to an absolutely dried weight of the cellulose nanofiber.

[5] The method according to any one of [1] to [3], wherein the cellulose nanofiber is a carboxymethylated cellulose nanofiber having a degree of carboxymethyl substitution of 0.01 to 0.50 per glucose unit of the cellulose nanofiber.

[6] A method for producing a rubber composition, the method comprising:
producing a masterbatch by the method according to any one of [1] to [5] and preparing the rubber composition using the obtained masterbatch.

Advantageous Effects of Invention

According to the present invention, the masterbatch in which the cellulose nanofibers are uniformly dispersed in the system can be produced and the rubber composition having excellent strength such as tensile strength can be provided by using the masterbatch.

DESCRIPTION OF EMBODIMENTS

In the present invention, a composition can be obtained through (A) to (D) steps described below. The composition is used as the masterbatch.

At the (A) step, carboxy groups are introduced to cellulose-based raw materials.

Origin of the cellulose-based raw material is not particularly limited. Examples of the cellulose-based raw material include plants (for example, wood, bamboo, hemp, jute, and kenaf), farmland residual waste, cloth, pulps (for example, an unbleached softwood kraft pulp (NUKP), a bleached softwood kraft pulp (NBKP), an unbleached hardwood kraft pulp (LUKP), a bleached hardwood kraft pulp (LBKP), an unbleached softwood sulfite pulp (NUSP), a bleached softwood sulfite pulp (NBSP), a thermomechanical pulp (TMP), a regenerated pulp, and waste paper), animals (for example, ascidians), algae, microorganisms (for example, acetic acid bacteria (acetobacter)), and microbial products. The cellulose-based raw materials used in the present invention may be any one of the raw materials or a combination of two or more. The cellulose-based raw materials (for example, cellulose fibers) derived from plants or microorganisms are preferable. The cellulose-based raw materials (for example, cellulose fibers) derived from plants are more preferable.

The fiber diameter of the cellulose-based raw material (for example, cellulose fibers) is not particularly limited. The number average fiber diameter of the softwood kraft pulp being a general pulp is usually about 30 µm to 60 µm and the number average fiber diameter of the hardwood kraft pulp is usually 10 µm to 30 µm. In the case of other pulps, the number average fiber diameter of the pulps that undergo general refining is about 50 µm. For example, in the case of refining a pulp made from chips having a size of several centimeters, the pulp is preferably mechanically treated with a disintegrator such as a refiner and a beater to control the number average fiber diameter to about 50 µm.

When carboxy groups are introduced to the cellulose-based raw material, the dispersion of the cellulose-based raw material may be prepared by carrying out the dispersion treatment of the cellulose-based raw material, if necessary. Solvents are not particularly limited as long as the solvents can disperse the cellulose-based raw material. Examples of the solvents include water, organic solvents (for example, hydrophilic organic solvents such as methanol), and a mixed solvent thereof. The cellulose-based raw material is hydrophilic and thus the solvent is preferably water.

The method for introducing the carboxy groups to the cellulose-based raw material may be any method as long as the method provides a modified cellulose having carboxy groups at least in a part. Examples of the method include oxidation, etherification, and esterification. Among them, oxidation, Carboxymethylation, and esterification are preferable.

When the oxidation is employed at the (A) step, the amount of the carboxy groups contained in the obtained modified cellulose, that is, the oxidized cellulose nanofibers is preferably 0.5 mmol/g or more, more preferably 0.8 mmol/g or more, and further preferably 1.0 mmol/g or more relative to the absolutely dried weight. The upper limit of the amount is preferably 3.0 mmol/g or less, more preferably 2.5 mmol/g or less, and further preferably 2.0 mmol/g or less. Consequently, the amount is preferably from 0.5 mmol/g to 3.0 mmol/g, more preferably from 0.8 mmol/g to 2.5 mmol/g, and further preferably from 1.0 mmol/g to 2.0 mmol/g.

The method of the oxidation is not particularly limited. One example of the method of the oxidization is a method in which the cellulose-based raw material is oxidized in water using an oxidizing agent in the presence of an N-oxyl compound, and a bromide, an iodide, or a mixture thereof. According to this method, the primary hydroxy group at the C6 position of the glucopyranose ring on the cellulose surface is selectively oxidized to produce at least one group selected from the group consisting of an aldehyde group, a carboxy group, and a carboxylate group. The concentration of the cellulose-based raw material at the time of reaction is not particularly limited and is preferably 5% by weight or less.

The N-oxyl compound refers to a compound capable of generating a nitroxy radical. Examples of the N-oxyl compound include 2,2,6,6-tetramethylpiperidin-1-oxyl (TEMPO). As the N-oxyl compound, any compound can be used as long as the compound promotes the target oxidation reaction.

The amount of the N-oxyl compound to be used is not particularly limited as long as the amount is a catalytic amount capable of the oxidizing cellulose as a raw material. For example, the amount is preferably 0.01 mmol or more and more preferably 0.05 mmol or more relative to 1 g of the absolutely dried cellulose-based raw material. The upper limit of the amount is preferably 10 mmol or less, more preferably 1 mmol or less, and further preferably 0.5 mmol or less. Therefore, the amount of the N-oxyl compound to be used is preferably from 0.01 mmol to 10 mmol, more preferably from 0.01 mmol to 1 mmol, and further preferably from 0.05 mmol to 0.5 mmol relative to 1 g of the absolutely dried cellulose-based raw material.

The bromide is a compound containing bromine and examples of the bromide include an alkali metal bromide such as sodium bromide, which can be ionized by dissociation in water. In addition, the iodide is a compound containing iodine and examples of the iodide include an alkali metal iodide. The amount of bromide or iodide to be used can be selected within a range that can promote the oxidation reaction. The amount of the bromide or the iodide (total amount thereof when both are used, the same will apply hereinafter) is preferably 0.1 mmol or more and more preferably 0.5 mmol or more relative to 1 g of the absolutely dried cellulose-based raw material. The upper limit of the amount is preferably 100 mmol or less, more preferably 10 mmol or less, and further preferably 5 mmol or less. Therefore, the amount of bromide or iodide is preferably from 0.1 mmol to 100 mmol, more preferably from 0.1 mmol to 10 mmol, and further preferably from 0.5 mmol to 5 mmol relative to 1 g of the absolutely dried cellulose-based raw material.

The oxidizing agent is not particularly limited and examples of the oxidizing agent include halogens, hypohalous acids, halous acids, perhalic acids, salts thereof, halogen oxides, and peroxides. Among them, the hypohalous acids or the salts thereof are preferable, hypochlorous acid or the salt thereof is more preferable, and sodium hypochlorite is further preferable because these materials are inexpensive and have low environmental load. The amount of the oxidizing agent to be used is preferably 0.5 mmol or more, more preferably 1 mmol or more, and further preferably from 3 mmol or more relative to 1 g of the absolutely dried cellulose-based raw material. The upper limit of the amount is preferably 500 mmol or less, more preferably 50 mmol or less, further preferably 25 mmol or less, and further more preferably 10 mmol or less. Therefore, the amount of the oxidizing agent to be used is preferably from 0.5 mmol to 500 mmol, more preferably from 0.5 mmol to 50 mmol, further preferably from 1 mmol to 25 mmol, and further more preferably from 3 mmol to 10 mmol relative to 1 g of the absolutely dried cellulose-based raw material. In addition, when the N-oxyl compound is used, the amount of the oxidizing agent to be used is preferably 1 mol or more relative to 1 mol of the N-oxyl compound. The upper limit of the amount is 40 mol or less. Therefore, the amount of the oxidizing agent to be used is preferably from 1 mol to 40 mol relative to 1 mol of the N-oxyl compound.

Conditions such as pH and temperature during the oxidation reaction are not particularly limited. In general, the reaction proceeds efficiently even under relatively mild conditions. The reaction temperature is preferably 4° C. or more and more preferably 15° C. or more. The upper limit of the reaction temperature is preferably 40° C. or less and more preferably 30° C. or less. Therefore, the reaction temperature is preferably from 4° C. to 40° C. and may be from about 15° C. to about 30° C., that is, room temperature. The pH of the reaction solution is preferably 8 or more and more preferably 10 or more. The upper limit of the pH is preferably 12 or less and more preferably 11 or less. Therefore, the pH of the reaction solution is preferably from about 8 to about 12 and more preferably from about 10 to about 11. Usually, as the oxidation reaction progresses, carboxy groups are generated in the cellulose, so that the pH of the reaction solution tends to decrease. Consequently, in order to efficiently promote the oxidation reaction, the pH of the reaction solution is preferably maintained within the above range by adding an alkaline aqueous solution such as an aqueous sodium hydroxide solution. The reaction medium during oxidation is preferably water from the viewpoint of easy handleability and difficulty in occurrence of side reactions.

The reaction time in the oxidation reaction can be appropriately set in accordance with the degree of progression of oxidation and is usually 0.5 hour or more. The upper limit of the reaction time is usually 6 hours or less and preferably 4 hours or less. Therefore, the reaction time in the oxidation reaction is usually from about 0.5 hour to about 6 hours, for example, from about 0.5 hour to about 4 hours.

The oxidation may be carried out in two or more separate stages of reactions. For example, by oxidizing the oxidized cellulose obtained by filtering after the completion of the reaction of the first stage again under the same or different reaction conditions, the oxidized cellulose can be efficiently oxidized without reaction inhibition caused by sodium chloride produced as a by-product in the reaction of the first stage.

As another example of the carboxylation (oxidation) method, oxidation by ozone treatment is exemplified. By this oxidation reaction, hydroxy groups at least at 2 position and 6 position of a glucopyranose ring are oxidized and, at the same time, decomposition of the cellulose chains occurs. The ozone treatment is usually carried out by contacting a gas including ozone with the cellulose-based raw material. The ozone concentration in the gas is preferably 50 $g/m^3$ or more. The upper limit of the ozone concentration is preferably 250 $g/m^3$ or less and more preferably 220 $g/m^3$ or less. Therefore, ozone concentration in the gas is preferably from 50 $g/m^3$ to 250 $g/m^3$ and more preferably from 50 $g/m^3$ to 220 $g/m^3$. The amount of ozone to be added is preferably 0.1 part by mass or more and more preferably 5 parts by mass or more relative to 100 parts by mass of the solid content of the cellulose-based raw material. The upper limit of the amount is usually 30 parts by mass or less. Therefore, the amount of ozone to be added is preferably from 0.1 part by mass to 30 parts by mass and more preferably from 5 parts by mass to 30 parts by mass relative to 100 parts by mass of the cellulose-based raw material. The ozone treatment temperature is usually 0° C. or more and preferably 20° C. or more. The upper limit of the ozone treatment temperature is usually 50° C. or less. Therefore, the ozone treatment temperature is preferably from 0° C. to 50° C. and more preferably from 20° C. to 50° C. The ozone treatment time is usually 1 minute or more and preferably 30 minutes or more. The upper limit of the ozone treatment time is usually 360 minutes or less. Therefore, the ozone treatment time is from about 1 minute to about 360 minutes and more preferably from about 30 minutes to about 360 minutes. When the ozone treatment conditions are within these ranges, excessive oxidization and decomposition of the cellulose can be prevented and the yield of the oxidized cellulose is improved.

The resultant product obtained after the ozone treatment may be additionally oxidized using an oxidizing agent. The oxidizing agent used for the additional oxidizing treatment is not particularly limited. Examples of the oxidizing agent include chlorine-based compounds such as chlorine dioxide and sodium chlorite; oxygen, hydrogen peroxide, persulfuric acid, and peracetic acid. Examples of the methods for the additional oxidation treatment include a method for preparing an oxidizing agent solution by dissolving these oxidizing agents in water or a polar organic solvent such as alcohol, and immersing the cellulose-based raw material in the solution.

The amount of the carboxy group, the carboxylate group, and the aldehyde group contained in the oxidized cellulose can be controlled by controlling the amount of the oxidizing agent to be added and the reaction time.

An example of a method for measuring the amount of the carboxy group will be described below. 60 ml of 0.5% by mass slurry (aqueous dispersion liquid) of the oxidized cellulose is prepared and 0.1 M hydrochloric acid aqueous solution is added to adjust the pH to 2.5. Thereafter, a 0.05 N sodium hydroxide aqueous solution is added dropwise to the slurry and the electric conductivity is measured until the pH reaches 11. The amount of the carboxy group can be calculated in accordance with the following formula from the amount of sodium hydroxide (a) consumed in the neutralization stage of the weak acid in which change in the electric conductivity is mild.

Amount of carboxy group [mmol/g oxidized cellulose or cellulose nanofiber]=$a$[ml]×0.05/Mass of oxidized cellulose [g]

Examples of the etherification include carboxymethylation (carboxymethyl etherification), methylation (methyl etherification), ethylation (ethyl etherification), cyanoethylation (cyanoethyl etherification), hydroxyethylation (hydroxyethyl etherification), hydroxypropylation (hydroxypropyl etherification), ethylhydroxyethylation (ethylhydroxyethyl etherification), and hydroxypropylmethylation (hydroxypropylmethyl etherification). Among them, carboxymethylation is preferable. The method of carboxymethylation is not particularly limited. Examples of the method of carboxymethylation include a method in which the cellulose-based raw material as the starting material is mercerized and thereafter etherified. Examples of the solvent include water, alcohols (for example, lower alcohols), and mixed solvents thereof. Examples of the lower alcohol include methanol, ethanol, N-propyl alcohol, isopropyl alcohol, N-butanol, isobutanol, and tertiary butanol. The mixing ratio of the lower alcohol in the mixed solvent is preferably from 60% by mass to 95% by mass. The amount of the solvent is usually 3 times by mass relative to the cellulose-based raw material. The upper limit of the amount is not particularly limited and is 20 times by mass. Therefore, the amount of the solvent is preferably from 3 times by mass to 20 times by mass.

The mercerization is usually carried out by mixing the starting material and the mercerizing agent. Examples of the mercerizing agent include alkali metal hydroxides such as sodium hydroxide and potassium hydroxide. The amount of the mercerizing agent to be used is preferably 0.5 times by mol or more, more preferably 1.0 times by mol or more, and further preferably 1.5 times by mol or more per anhydrous glucose residue of the starting material. The upper limit of the amount is usually 20 times by mol or less, preferably 10 times by mol or less, and more preferably 5 times by mol or less. Therefore, the amount of the mercerizing agent to be used is preferably from 0.5 times by mol to 20 times by mol, more preferably from 1.0 times by mol to 10 times by mol, and further preferably from 1.5 times by mol to 5 times by mol. As the mercerizing agent, an alkali metal hydroxide such as sodium hydroxide or potassium hydroxide in an amount of 0.5 times by mol to 20 times by mol per anhydrous glucose residue of the starting material is preferably used.

The reaction temperature of the mercerization is usually 0° C. or more and preferably 10° C. or more. The upper limit of the reaction temperature is 70° C. or less and preferably 60° C. or less. Therefore, the reaction temperature is usually from 0° C. to 70° C. and preferably from 10° C. to 60° C. The reaction time is usually 15 minutes or more and preferably 30 minutes or more. The upper limit of the reaction time is usually 8 hours or less and preferably 7 hours or less. Therefore, the reaction time is usually from 15 minutes to 8 hours and preferably from 30 minutes to 7 hours.

The etherification reaction is usually carried out by adding a carboxymethylating agent to the reaction system after the mercerization. Examples of the carboxymethylating agent include sodium monochloroacetate. Usually, the amount of the carboxymethylating agent to be added is preferably 0.05 times by mol or more, preferably 0.5 times by mol or more, and further preferably 0.8 times by mol or more per glucose residue of the cellulose-based raw material. The upper limit of the amount is usually 10.0 times by mol or less, preferably 5 times by mol or less, and more preferably 3 times by mol or less. Therefore, the amount of the carboxymethylating agent to be added is preferably from 0.05 times by mol to 10.0 times by mol, more preferably from 0.5 times by mol to 5 times by mol, and further preferably from 0.8 times by mass to 3 times by mol. The reaction temperature is usually 30° C. or more and preferably 40° C. or more. The upper limit of the reaction temperature is 90° C. or less and preferably 80° C. or less. Therefore, the reaction temperature is usually from 30° C. to 90° C. and preferably from 40° C. to 80° C. The reaction time is usually 30 minutes or more and preferably 1 hour or more. The upper limit of the reaction time is usually 10 hours or less and preferably 4 hours or less. Therefore, the reaction time is usually from 30 minutes to 10 hours and preferably from 1 hour to 4 hours. The reaction solution may be stirred during the carboxymethylation reaction, if necessary.

The degree of carboxymethyl substitution per glucose unit in the carboxymethyl group-containing modified cellulose nanofibers (carboxymethyl cellulose nanofibers) obtained by the carboxymethylation is preferably 0.01 or more, more preferably 0.05 or more, and further preferably 0.10 or more. The upper limit of the degree of carboxymethyl substitution is preferably 0.50 or less, more preferably 0.40 or less, further preferably 0.35 or less, and further more preferably 0.30 or less. Therefore, the degree of carboxymethyl substitution is preferably from 0.01 to 0.50, more preferably from 0.05 to 0.40, further preferably from 0.10 to 0.35, and further more preferably from 0.10 to 0.30.

The degree of carboxymethyl substitution can be measured, for example, by the following method. Namely, 1) About 2.0 g of the carboxymethylated cellulose fibers (absolutely dried) is precisely weighed and placed in a 300 mL conical flask with a stopper. 2) To the placed carboxymethylated cellulose fibers, 100 mL of a liquid prepared by adding 100 mL of concentrated nitric acid (special grade) to 1000 mL of nitric acid/methanol is added and the resultant mixture was shaken for 3 hours to prepare the carboxymethyl cellulose in which the carboxymethyl cellulose salt was substituted with proton (hereinafter, referred to as the hydrogen type carboxymethyl cellulose). 3) 1.5 to 2.0 g of the hydrogen type carboxymethyl cellulose (absolutely dried) is precisely weighed and placed in a 300 mL conical flask with a stopper. 4) The hydrogen type carboxymethyl cellulose was wetted with 15 mL of 80% methanol and 100 mL of 0.1 N NaOH was added to the resultant mixture, followed by shaking the obtained mixture for 3 hours at room temperature. 5) The back titration of the excessive NaOH was carried out with 0.1 N $H_2SO_4$ using phenolphthalein as an indicator. 6) The degree of carboxymethyl substitution (DS) is calculated in accordance with the following formula:

$$A=[(100 \times F-(0.1N\ H_2SO_4)(mL) \times F) \times 0.1]/(\text{Absolutely dried weight of hydrogen type carboxymethyl cellulose (g)})$$

$$DS=0.162 \times A/(1-0.058 \times A)$$

A: Amount of 1 N NaOH (mL) required for neutralizing 1 g of hydrogen type carboxymethyl cellulose
F'': Factor of 0.1 N $H_2SO_4$
F: Factor of 0.1 N NaOH The method of esterification is not particularly limited. Examples of the method include a method for reacting the cellulose-based raw material with a compound A. The compound A will be described below. Examples of the method for reacting the compound A with the cellulose-based raw material include a method for mixing the powder or aqueous solution of the compound A to the cellulose-based raw material and a method for adding the aqueous solution of the compound A to the slurry of the cellulose-based raw material. Among them, the method for mixing the aqueous solution of the compound A to the cellulose-based raw material or slurry thereof is preferable because the uniformity of the reaction is improved and the esterification efficiency is improved.

Examples of the compound A include phosphoric acid, polyphosphoric acid, phosphorous acid, phosphonic acid, polyphosphonic acid, and esters thereof. The compound A may be in the form of a salt. The compound A is preferably phosphoric acid-based compounds because the phosphoric acid-based compounds are low in cost and easy to handle and allows defibration efficiency to be improved by introducing phosphate groups to the cellulose of pulp fibers. The phosphoric acid-based compound may be a compound having a phosphoric acid group. Example of the phosphoric acid-based compound include phosphoric acid, sodium dihydrogen phosphate, disodium hydrogen phosphate, trisodium phosphate, sodium pyrophosphate, sodium metaphosphate, potassium dihydrogen phosphate, dipotassium hydrogen phosphate, tripotassium phosphate, potassium pyrophosphate, potassium metaphosphate, ammonium dihydrogen phosphate, diammonium hydrogen phosphate, triammonium phosphate, ammonium pyrophosphate, and ammonium metaphosphate. The phosphoric acid-based compound to be used may be used singly or in combination of two or more of the phosphoric acid-based compounds. Among them, phosphoric acid, the sodium salts of phosphoric acid, the potassium salts of phosphoric acid, and the ammonium salts of phosphoric acid are preferable and sodium dihydrogen phosphate and disodium hydrogen phosphate are more preferable from the viewpoint of high efficiency of phosphate group introduction, easy defibration in the defibration process described below, and easy applicability in industry. In addition, the aqueous solution of the phosphoric acid-based compound is preferably used in esterification because uniformity of the reaction is improved and the efficiency of the phosphate group introduction is improved. The pH of the aqueous solution of the phosphoric acid-based compound is preferably 7 or less from the viewpoint of improving the efficiency of the phosphate group introduction and is preferably from 3 to 7 from the viewpoint of reducing hydrolysis of pulp fibers.

Examples of the method of esterification include the following method. Phosphate groups are introduced to the cellulose by adding the compound A into the suspension of the cellulose-based raw material (for example, a solid content concentration of 0.1% by mass to 10% by mass) with stirring the suspension. When the cellulose-based raw material is determined to be 100 parts by mass, the amount of the compound A to be added is preferably 0.2 part by mass or more and more preferably 1 part by mass or more in terms of phosphorus element in the case where the compound A is a phosphoric acid-based compound. This can further improve the yield of the microfibrous cellulose. The upper limit of the amount is preferably 500 parts by mass or less and more preferably 400 parts by mass or less. Accordingly, the yield can be efficiently obtained corresponding to the amount of the compound A to be used. Therefore, the amount is preferably from 0.2 part by mass to 500 parts by mass and more preferably 1 part by mass to 400 parts by mass.

When the compound A is reacted with the cellulose-based raw material, a compound B may be further added to the reaction system. Examples of the method for adding the compound B to the reaction system include a method for adding the compound B to the slurry of the cellulose-based raw material, the aqueous solution of the compound A, or the slurry of the cellulose-based raw material and the compound A.

The compound B is not particularly limited and preferably exhibits basicity. Nitrogen-containing compounds indicating basicity are more preferable. The term "exhibits basicity" usually means that the aqueous solution of the compound B in the presence of phenolphthalein indicator exhibits color of pink to red and/or the pH of the aqueous solution of the compound B is more than 7. The nitrogen-containing compounds exhibiting basicity is not particularly limited as long as the nitrogen-containing compounds provides the effect of the present invention. Compounds having an amino group are preferable. Examples of the nitrogen-containing compounds include urea, methylamine, ethylamine, trimethylamine, triethylamine, monoethanolamine, diethanolamine, triethanolamine, pyridine, ethylenediamine, and hexamethylenediamine. Urea is preferable from the viewpoint of low cost and easy handling. The amount of the compound B to be added is preferably from 2 parts by mass to 1000 parts by mass and more preferably from 100 parts by mass to 700 parts by mass. The reaction temperature is preferably from 0° C. to 95° C. and more preferably from 30° C. to 90° C. The reaction time is not particularly limited and is usually from about 1 minute to 600 minutes and preferably from 30 minutes to 480 minutes. When the conditions of the esterification reaction are within any of these ranges, excessive esterification of the cellulose, which causes easy dissolution, can be prevented and the yield of the phosphate-esterified cellulose can be improved.

After the compound A is reacted with the cellulose-based raw material, usually an esterified cellulose suspension is obtained. The esterified cellulose suspension is dewatered, if necessary. After the dewatering, heating treatment is preferably carried out. This can reduce hydrolysis of the cellulose-based raw material. The heating temperature is preferably from 100° C. to 170° C. More preferably, the heating treatment is carried out at 130° C. or less (further preferably, 110° C. or less) while water is included at the time of heating treatment and carried out from 100° C. to 170° C. after water is removed.

In the phosphate-esterified cellulose, phosphate groups are introduced to the cellulose-based raw material as substituents and the cellulose electrically repel each other. Therefore, the phosphate-esterified cellulose can be easily nano-defibrated. The degree of the phosphate group substitution per glucose unit of the phosphate-esterified cellulose is preferably 0.001 or more. This can achieve sufficient defibration (for example, nano-defibration). The upper limit of the degree of the phosphate group substitution is preferably 0.40. This allows swelling or dissolution of the phosphate-esterified cellulose to be prevented and the situation where nanofibers cannot be obtained to be prevented. Therefore, the degree of the phosphate group substitution is preferably from 0.001 to 0.40. The phosphate-esterified cellulose is preferably subjected to washing treatment such as washing with cold water after boiling. This allows the defibration to be effectively carried out.

At the (B) step, the modified cellulose is defibrated and dispersed.

The modified cellulose obtained at the (A) step contains carboxy groups and thus the action of the charge repulsion force is generated by the carboxy groups. Consequently, by carrying out the defibration treatment at the step (B), the energy required for the defibration can be reduced as compared with the case of the defibration treatment of the cellulose-based raw material.

An apparatus used for defibration is not particularly limited. Examples of the apparatus include a high-speed rotation type apparatus, a colloid mill type apparatus, a high pressure type apparatus, a roll mill type apparatus, and an ultrasonic type apparatus. A high pressure or ultrahigh pressure homogenizer is preferable and a wet type high pressure or ultrahigh pressure homogenizer is more preferable. The apparatus is preferably capable of applying strong shear force to the cellulose-based raw material or the modified cellulose (usually a dispersion liquid). The pressure applied to the modified cellulose is preferably 50 MPa or more, more preferably 100 MPa or more, and further preferably 140 MPa or more. The apparatus is preferably a wet type high pressure or ultrahigh pressure homogenizer that can apply the above pressure to the cellulose-based raw material or the modified cellulose (usually the dispersion liquid) and can apply strong shear force. This can effectively carry out the defibration. The number of treatment times (pass times) in the defibration apparatus may be one or may be two or more and preferably two or more.

Usually, the modified cellulose is dispersed in a solvent in the dispersion treatment. The solvent is not particularly limited as long as the modified cellulose can be dispersed. Example of the solvent include water, an organic solvent (for example, a hydrophilic organic solvent such as methanol), and a mixed solvent thereof. The cellulose-based raw material is hydrophilic, and thus the solvent is preferably water.

The solid content of the modified cellulose in the dispersion is usually 0.1% by mass or more, preferably 0.2% by mass or more, and further preferably 0.3% or more. This makes the liquid amount relative to the amount of the modified cellulose an appropriate amount, which is effective. The upper limit of the solid content is usually 10% by mass or less and preferably 6% by mass or less. This allows the flowability to be retained.

The order of the defibration treatment and the dispersion treatment is not particularly limited. Whichever treatment may be carried out first or carried out at the same time. The defibration treatment, however, is preferably carried out after the dispersion treatment. The combination of each of the treatments may be carried out at least once or may be repeated twice or more.

Prior to the defibration treatment or the dispersion treatment, a pre-treatment may be carried out, if necessary. The pretreatment may be carried out using a mixing device such as a high shear mixer, a stirring device, an emulsification device, or a dispersing device.

The average fiber diameter of the cellulose nanofibers obtained at the (B) step is preferably 0.5 nm or more, 1 nm or more, 1.5 nm or more, or 2 nm or more. The upper limit of the average fiber diameter is preferably 500 nm or less. Therefore, the average fiber diameter is more preferably from about 0.5 nm to about 500 nm, from about 1 nm to about 500 nm, from about 1.5 nm to about 500 nm, or from about 2 nm to about 500 nm. The measurement of the average fiber diameter and average fiber length of the cellulose nanofibers can be calculated as a number average fiber diameter or a number average fiber length, for example, by preparing a 0.001% by mass aqueous dispersion liquid of the cellulose nanofibers, thinly extending this diluted dispersion liquid to a sample stage made of mica, heating and drying the sample at 50° C. to prepare a sample for observation, and measuring the sectional height of a shape image observed with an atomic force microscope (AFM).

The average aspect ratio of the cellulose nanofibers obtained at the (B) step is usually 50 or more. The upper limit of the average aspect ratio is not particularly limited and usually 1000 or less. The average aspect ratio can be calculated in accordance with the following formula:

$$\text{Aspect ratio} = \text{Average fiber length}/\text{Average fiber diameter}$$

At the (C) step, the cellulose nanofibers are acidified. Accordingly, the carboxylic acid salt in the modified cellulose can be converted into the carboxylic acid and thus acid type cellulose nanofibers can be obtained. The acid type cellulose nanofibers obtained after the acidification treatment is usually aggregated and exhibits a gel-like substance.

The acidification treatment is usually treatment of adding an acid to the dispersion liquid of the cellulose nanofibers. The acid may be an inorganic acid or an organic acid. Examples of the inorganic acids include mineral acids such as sulfuric acid, hydrochloric acid, nitric acid, sulfurous acid, nitrous acid, phosphoric acid, and a residual acid of a chlorine dioxide generator. The inorganic acid is suitably hydrochloric acid. Examples of the organic acids include acetic acid, lactic acid, oxalic acid, citric acid, and formic acid and. The pH at the time of the acid treatment is usually 2 or more and preferably 3 or more. The upper limit of the pH is preferably 6 or less and preferably 5 or less. Therefore, the pH is preferably from 2 to 6 and more preferably from 2 to 5, and further preferably from 3 to 5. The amount of the acid to be added is not particularly limited. The addition of the acid may be terminated at the time that the cellulose nanofibers aggregate and a translucent gel-like substance precipitates.

After the acidification, washing treatment is preferably carried out. This allows the dispersion liquid of the acid type cellulose nanofibers to be obtained and thus the treatment at the (D) step can smoothly proceed.

The washing treatment is preferably carried out to the extent of removing a free acid from the gel-like substance. This allows the storage stability and dispersibility of the acid type cellulose nanofibers to be improved. In addition, at the (D) step, the acid type cellulose nanofibers and a rubber component can interact with each other and thus the dispersibility becomes more uniform. The content of the free acid in the washing solution after completion of the washing is not particularly limited. The content is preferably 0.05% by mass or less and more preferably equal to or less than the detection limit.

The method of the washing treatment is not particularly limited and examples of the method include a method for preliminarily dewatering and washing the gel-like substance obtained after acidification, if necessary, and thereafter dispersing and pulverizing the washed gel-like substance and a method of repeating such a series of processes two times or more. As the solvent, any solvent can be freely used as long as the cellulose nanofibers can be sufficiently dispersed in the solvent. Examples of the solvent include water, an organic solvent, and a mixed solvent made of two or more solvents selected from these solvents. The organic solvent is preferably a hydrophilic solvent such as methanol. The mixed solvent preferably includes at least water. The solvent is preferably water, a hydrophilic organic solvent, or a hydrophilic mixed solvent and more preferably water due to the hydrophilicity of the cellulose-based raw material. The amount of solvent to be added is usually to such a degree that the solid content of the gel-like substance is about 1% to 2%.

The dispersion may be carried out using a slurry-forming apparatus such as a mixer. The dispersion is preferably carried out until the particle diameter is reduced (slurried) to such a degree that the gel-like substance does not precipitate in a short time.

The pulverization is usually carried out using a conventional pulverization apparatus. Examples of the pulverization apparatus include a pulverization apparatus using a medium such as a bead mill and a pulverization apparatus not using a medium such as a high-speed rotary pulverization apparatus, a colloid mill type pulverization apparatus, a high pressure type pulverization apparatus, a roll mill type pulverization apparatus, and an ultrasonic disperser. Among them, the pulverization apparatus not using a medium is preferable, a wet type high pressure dispersing machine is more preferable, and a wet type high pressure or ultrahigh pressure homogenizer is further preferable. These apparatuses can efficiently provide a dispersion liquid in which the acid type cellulose nanofibers are sufficiently dispersed. The pulverization condition is preferably 50 MPa or more, more preferably 100 MPa or more, and further preferably 140 MPa or more. The pulverization apparatus preferably has a capacity to disperse under these conditions. The number of treatment times (pass times) in the pulverization apparatus may be one or two or more.

In the washing treatment, dewatering may be carried out, if necessary. Examples of the dewatering include dewatering by centrifugation. The dewatering is preferably carried out until the solid content in the solvent is about 3% to about 20%.

The temperature of the washing treatment is preferably 10° C. or more and more preferably 20° C. or more. The upper limit of the temperature of the washing treatment is preferably 50° C. or less and more preferably 40° C. or less. Therefore, the temperature of the washing treatment is preferably from 10° C. to 50° C. and more preferably from 20° C. to 40° C.

The acid type cellulose nanofibers obtained at the (C) step has a ratio (Acid type/(Acid type+Salt type)) of the degree of substitution relative to the salt type cellulose nanofibers (the cellulose nanofibers obtained at the (B) step and not carrying out the (C) step) of preferably 20% or more and more preferably 40% or more. This allows the effect of the acid type cellulose nanofibers to be obtained.

The ratio of the degree of acid type substitution can be measured, for example, by the following method.

1) 1 g of a sample (in terms of pure content) is placed into a flask containing 200 ml of pure water and 100 ml of N/10 NaOH and dissolved.

2) The excess N/10 NaOH was titrated by adding N/10 $H_2SO_4$ dropwise using phenolphthalein as an indicator to give the dropping amount B (ml).

3) 1 g of another sample (in terms of pure content) is placed in a porcelain crucible, the ash is formed at 600° C., and sodium oxide generated by the ashing is neutralized by adding 100 ml of N/10 $H_2SO_4$.

4) The excess $H_2SO_4$ was titrated by adding N/10 NaOH dropwise using phenolphthalein as an indicator to give a dropping amount C (ml).

5) Each of the degree of salt type substitution and degree of acid type substitution of the cellulose nanofibers is determined in accordance with the following formula and the ratio of the degree of acid type substitution is determined from the ratio thereof. At this time, the titer of $H_2SO_4$ is $f_1=N/10$ and the titer of NaOH is $f_2=N/10$.

[Mathematical Formula 1]
$$\text{Degree of salt type substitution} = \frac{(162 \times (100 \times f_1 - C \times f_2))}{10{,}000 - 58 \times (100 \times f_2 - 6 \times f_1) - 80 \times (100 \times f_1 - C \times f_2)}$$

$$\text{Degree of acid type substitution} = \frac{(162 \times (100 \times f_1 - B \times f_2))}{10{,}000 - 58 \times (100 \times f_2 - 6 \times f_1) - 80 \times (100 \times f_1 - C \times f_2)}$$

At the (D) step, the acid type cellulose nanofibers and a rubber component are mixed.

The rubber component is usually a component including an organic polymer as a main component and having a high elastic limit and a low elastic modulus. The rubber component is roughly classified into natural rubber and synthetic rubber. Whichever rubber may be used or a combination of both may be used in the present invention. Examples of the synthetic rubber include diene-based rubber such as butadiene rubber (BR), styrene-butadiene copolymer rubber (SBR), isoprene rubber (IR), butyl rubber (IIR), acrylonitrile-butadiene rubber (NBR), acrylonitrile-styrene-butadiene copolymer rubber, chloroprene rubber, styrene-isoprene copolymer rubber, styrene-isoprene-butadiene copolymer rubber, and isoprene-butadiene copolymer rubber, ethylene-propylene rubber (EPM, EPDM), acrylic rubber (ACM), epichlorohydrin rubber (CO, ECO), fluororubber (FKM), silicone rubber (Q), urethane rubber (U), and chlorosulfonated polyethylene (CSM). Examples of the natural rubber include hydrogenated natural rubber and deproteinized natural rubber. The rubber component may be used singly or in combination of two or more of them. The rubber component may be in either a solid form or a liquid form. Examples of the liquid rubber component include the dispersion liquid of the rubber component and the solution of the rubber component. Examples of the solvent include water and an organic solvent.

At the (D) step, the dispersion liquid of the acid type cellulose nanofibers is mixed with the aqueous dispersion liquid (latex) of the rubber component and thereafter the solvent is removed to give a composition. The method of mixing is not particularly limited and a known mixing apparatus such as a mixer can be used. Examples of the method for removing the solvent include a method for drying the mixture with a known apparatus such as an oven and a method for adding an acid such as formic acid, sulfuric acid, and an organic acid or a slat such as sodium chloride to aggregate the mixture.

The content of the acid type cellulose nanofibers relative to 100% by mass of the rubber component is preferably 1% by mass or more, more preferably 1.5% by mass or more, and further preferably 2% by mass or more. This allows the effect of improving strength such as tensile strength of the rubber obtained when the composition is used as a masterbatch to be achieved. The upper limit of the content is preferably 100% by mass or less, more preferably 50% by mass or less, and further preferably 30% by mass or less. This allows the lowering of workability in the manufacturing process to be reduced. Therefore, the content of the acid type cellulose nanofibers is preferably 1% by mass or more and 100% by mass or less, more preferably from 1.5% by mass to 50% by mass, and further preferably from 2% by mass to 30% by mass.

Through the (A) to (D) steps, a composition in which the cellulose nanofibers are uniformly dispersed can be obtained. Although the reason is not clear, it is assumed that the hydrophilicity may be lowered by the conversion of the carboxy group in the cellulose nanofibers from the salt type to the acid type and thus the cellulose nanofibers may be difficult to aggregate each other at the time of drying.

The composition obtained through the (A) to (D) steps can be used as a masterbatch and can be used as a raw material of the rubber composition. The rubber composition can be obtained, for example, by further adding rubber components and/or various additives, if necessary, to the composition obtained through the (A) to (D) steps, kneading and molding the resultant mixture, carrying out crosslinking reaction such as vulcanization, and carrying out the finishing treatment.

Other rubber components may be at least one rubber component selected from the exemplified rubber components in the preceding paragraph or may be a combination of two or more of them.

The additives may be any additives that can be used in the rubber industry. Examples of the additives include mastication accelerators, softeners/plasticizers, curing agents (for example, a phenol resins and a high styrene resins), agents for crosslinking (for example, crosslinking agents such as sulfur, vulcanization accelerators (for example, N-t-butyl-2-benzothiazolesulfenamide and N-oxydiethylene-2-benzothiazolylsulfenamide), vulcanization accelerating aids (for example, stearic acid and zinc sulfide), and scorch preventing agent), antioxidants, foaming agents, fillers (for example, carbon black and silica), coupling agents, pressure sensitive adhesives (for example, a macron resin, phenol, a terpene resin, a petroleum hydrocarbon resin, and a rosin derivative), dispersants (for example, a fatty acid), adhesion promoters (for example, an organic cobalt salt), lubricants (for example, paraffin, a hydrocarbon resin, a fatty acid, and a fatty acid derivative), peptizers, pH adjusters, and coloring agents. The additives may be used singly or in combination of two or more additives and the amount of the additives to be used can be appropriately determined as necessary.

Kneading is carried out by a conventional kneading apparatus. Examples of the kneading apparatus include a Banbury mixer, a kneader, and open rolls. The temperature during kneading is preferably a temperature that does not cause crosslink reaction of the rubber component at the time of kneading when sulfur or the vulcanization accelerator is blended. The temperature, for example, is preferably 10° C. or more and more preferably 20° C. or more. The upper limit of the temperature is preferably 140° C. or less and more preferably 120° C. or less. Therefore, the temperature is preferably from about 10° C. to about 140° C. and more preferably from about 20° C. to about 120° C.

The molding is usually carried out by a molding apparatus. Examples of the molding apparatus include die molding, injection molding, extrusion molding, blow molding, and foam molding. The apparatus can be selected in accordance with the application and the rubber composition can be molded into a desired shape.

The vulcanization is usually carried out by adding sulfur and the vulcanization accelerator. This allows the rubber component to be vulcanized and, in addition, a crosslinked structure between the modified substituents in the modified cellulose fibers and the rubber component to be formed. The amount of sulfur to be used is preferably 0.1% by mass or more, more preferably 0.5% by mass or more, and further preferably 1% by mass or more relative to the rubber component. The upper limit of the amount is preferably 50% by mass or less, preferably 35% by mass or less, and further preferably 20% by mass or less. Therefore, the amount of sulfur to be used is preferably from about 0.1 part by mass to about 50 parts by mass, more preferably from about 0.5 part by mass to about 35 parts by mass, and further preferably from about 1 part by mass to about 20 parts by mass.

The amount of the vulcanization accelerator to be used is preferably 0.1% by mass, more preferably 0.3% by mass or more, and further preferably 0.4% by mass or more relative to the rubber component. The upper limit of the amount is preferably 5% by mass or less, more preferably 3% by mass or less, and further preferably 2% by mass or less.

The vulcanization temperature is preferably 150° C. or more. The upper limit of the vulcanization temperature is preferably 200° C. or less and more preferably 180° C. or less. Therefore, the vulcanization temperature is preferably from about 150° C. to about 200° C. and more preferably from about 150° C. to about 180° C. Examples of the heating apparatus include vulcanization apparatus such as mold vulcanization, pan vulcanization, and continuous vulcanization. Examples of the method of vulcanization include press vulcanization.

Prior to forming the final product, the vulcanized rubber composition may be subjected to finishing treatment, if necessary. Examples of the finishing treatment include known treatment such as polishing, surface treatment, lip finishing, lip cutting, and chlorine treatment. These treatments may be carried out singly or in combination of two or more of them.

The application of the rubber composition of the present invention is not particularly limited. The rubber composition is applicable for members made of rubbers or flexible plastics used in, for example, transportation apparatuses such as automobiles, trains, ships, and airplanes; electric appliances such as personal computers, televisions, telephones, and watches; mobile communication devices such as mobile phones; portable music playback devices, video playback devices, printing devices, copying devices, sporting goods; building materials, office devices such as stationery, cases, and containers. The rubber composition is suitably used for tires. Examples of the tires include pneumatic tires for passenger vehicles, trucks, buses, and heavy vehicles.

Example

Hereinafter, the present invention will be described in further detail with reference to Examples. The present invention, however, is not limited thereto. Each measurement value shown in the following Examples is a numerical value measured by each of the measurement methods described above, unless otherwise specified.

Production Example 1: Preparation of Oxidized Cellulose Nanofibers 5.00 g of bleached unbeaten kraft pulp (absolutely dried) derived from softwood (a degree of whiteness 85%) was added to 500 ml of an aqueous solution in which 39 mg (0.05 mmol relative to 1 g of the absolutely dried cellulose) of TEMPO (manufactured by Sigma Aldrich Co. LLC.) and 514 mg of sodium bromide (1.0 mmol relative to 1 g of the absolutely dried cellulose) were dissolved and the resultant mixture was stirred until the pulp was uniformly dispersed. An aqueous solution of sodium hypochlorite was added to the reaction system so that sodium hypochlorite was 6.0 mmol/g and oxidation reaction was started. During the reaction, the pH in the system decreased and thus 3M sodium hydroxide aqueous solution was added sequentially to adjust the pH at 10. The reaction was terminated when sodium hypochlorite was consumed and the pH in the system was ceased to change. The mixture after the reaction was filtered with a glass filter to separate the pulp and the pulp was sufficiently washed with water to give an oxidized pulp (carboxylated cellulose). The yield of the pulp at this time was 90%. The time required for the oxidation reaction was 90 minutes and the carboxy group content was 1.6 mmol/g. The concentration of this pulp was adjusted with water to 1.0% (w/v). The resultant mixture was treated with an ultrahigh pressure homogenizer (20° C., 150 Mpa) three times to give an oxidized cellulose nanofiber dispersion liquid. The average fiber diameter was 3 nm and the aspect ratio was 250.

Production Example 2<Production of Carboxymethylated Cellulose Nanofibers>

Into a stirrer capable of mixing pulp, 200 g as dry mass of a pulp (NBKP (softwood bleached kraft pulp), manufactured by Nippon Paper Industries Co., Ltd.) and 111 g as dry mass of sodium hydroxide (2.25 times by mol per anhydrous glucose residue of the starting material) were added and water was added so that the pulp solid content was 20% (w/v). Thereafter, after the resultant mixture was stirred at 30° C. for 30 minutes, 216 g of sodium monochloroacetate (in terms of active component, 1.5 times by mol per glucose residue of the pulp) was added. After the resultant mixture was stirred for 30 minutes, the temperature was raised to 70° C. and the mixture was stirred for 1 hour. Thereafter, the reaction product was taken out, neutralized, and washed to give a carboxymethylated pulp having a degree of carboxymethyl substitution per glucose unit of 0.25. This product was diluted with water so that the solid content was 1% and the diluted mixture was treated five times with a high pressure homogenizer at 20° C. and at a pressure of 150 MPa to give defibrated carboxymethyl cellulose nanofibers. The carboxymethyl cellulose nanofibers had an average fiber diameter of 15 nm and an aspect ratio of 50.

Example 1

HCl was added to 500 g of the aqueous dispersion liquid of the oxidized cellulose nanofibers in Production Example 1 until the pH reached 2.4 to give gel-like aggregate. The aggregate was dewatered and sufficiently washed with water. Thereafter water was added and the resultant mixture was dispersed with a mixer to give a dispersion liquid (slurry) having a solid content concentration of 1%. This slurry was treated five times with an ultrahigh pressure homogenizer (treatment pressure 140 MPa) to give a 1% aqueous dispersion liquid of acid type cellulose nanofibers.

325 g of the above aqueous dispersion liquid and 100 g of natural rubber latex (trade name: HA Latex, manufactured by Regitex Co., Ltd, solid content concentration 65%) were mixed so that the weight ratio of the rubber component and the acid type cellulose nanofibers was 100:5 and the resultant mixture was stirred for 10 minutes with a TK homomixer (8000 rpm). Thereafter, the obtained mixed solution was dried in a heating oven at 70° C. for 5 hours to give a masterbatch.

The above masterbatch was kneaded with open rolls (manufactured by Kansai Roll Co., Ltd.) at 30° C. for 10 minutes. Subsequently, 2.3 g of sulfur (3.5% by mass relative to the rubber component) and 0.5 g of a vulcanization accelerator (BBS, N-t-butyl-2-benzothiazolesulfenamide) (0.5% by mass relative to the rubber component) was added and the resultant mixture was kneaded at 30° C. for 10 minutes using the open rolls (manufactured by Kansai Roll Co., Ltd.) to give the sheet of an unvulcanized rubber composition.

This sheet was sandwiched between molds and press vulcanized at 150° C. for 10 minutes to give the sheet of a vulcanized rubber composition having a thickness of 2 mm. This sheet was cut into specimens having a predetermined shape and each tensile stress at 100% strain and 300% strain and tensile strength at break of the specimen, which indicated tensile strength, was measure in accordance with JIS K 6251 "Rubber, vulcanized or thermoplastics-Determination of tensile stress-strain properties". As each of the numerical values becomes larger, the reinforcement of the vulcanized rubber composition becomes better and the mechanical strength of the rubber becomes more excellent.

Example 2

Example 2 was carried out in the same manner as Example 1 except that the oxidized cellulose nanofibers used in Example 1 were replaced with the carboxymethylated cellulose nanofibers prepared in Production Example 2.

Comparative Example 1

Comparative Example 1 was carried out in the same manner as Example 1 except that the oxidized cellulose nanofibers were used without the acidification treatment.

Comparative Example 2

Comparative Example 2 was carried out in the same manner as Example 1 except that the cellulose nanofibers used in Example 1 were replaced with the carboxymethylated cellulose nanofibers prepared by the above method and the carboxymethylated cellulose nanofibers was used without the acidification treatment.

Comparative Example 3

Comparative Example 3 was carried out in the same manner as Example 1 except that the cellulose nanofibers used in Example 1 were not used.

TABLE 1

|  | Example | | Comparative Example | | |
| --- | --- | --- | --- | --- | --- |
|  | 1 | 2 | 1 | 2 | 3 |
| Method for modifying cellulose nanofibers | Oxidation | Carboxymethylation | Oxidation | Carboxymethylation | — |
| Acid type/salt type of carboxy groups in cellulose nanofibers | Acid type | Acid type | Salt type | Salt type | — |
| Tensile stress at 100% strain [Mpa] | 1.4 | 1.3 | 1.1 | 1.0 | 0.8 |
| Tensile stress at 300% strain [Mpa] | 5.9 | 5.3 | 4.1 | 3.6 | 2.3 |
| Tensile strength at break [Mpa] | 28.8 | 25.9 | 20.3 | 18.3 | 19.9 |

As is clear from Table 1, the rubber compositions of Examples 1 and 2 including the acid type cellulose nanofibers had high tensile stresses at both 100% strain and 300% strain and large tensile strength at break, compared with Comparative Example 1 including the salt type cellulose nanofibers or Comparative Example 2 not including cellulose nanofibers. This is presumed to be because of uniform dispersion of the cellulose nanofibers in the master batch of the present invention in a micro level and indicates that the masterbatch can excellently reinforce the rubber composition to be obtained and thus the rubber composition including the master batch of the present invention has excellent strength.

The invention claimed is:
1. A method for producing a masterbatch, the method comprising:
   (A) introducing a carboxy group to a cellulose-based raw material to prepare a modified cellulose;
   (B) carrying out a defibration treatment and a dispersion treatment of the modified cellulose to prepare a modified cellulose nanofiber;
   (C) acidifying the modified cellulose nanofiber to a pH of 2 to 5 to obtain a gel precipitate of aggregated acidified modified cellulose nanofibers; and
   (D) mixing the gel precipitate of the aggregated acidified modified cellulose nanofibers and a rubber component, to obtain a masterbatch.
2. The method according to claim 1, further comprising: carrying out a washing treatment after the acidifying (C).

3. The method according to claim 1, wherein the introducing (A) of the carboxy group comprising introducing a carboxy group by oxidation or carboxymethylation.

4. The method according to claim 1, wherein the modified cellulose nanofiber is an oxidized cellulose nanofiber having an amount of carboxy groups of 0.5 mmol/g to 3.0 mmol/g relative to an absolutely dried weight of the modified cellulose nanofiber.

5. The method according to claim 1, wherein the modified cellulose nanofiber is a carboxymethylated cellulose nanofiber having a degree of carboxymethyl substitution of 0.01 to 0.50 per glucose unit of the modified cellulose nanofiber.

6. A method for producing a rubber composition, the method comprising:
producing a masterbatch by the method of claim 1 and preparing the rubber composition with the masterbatch.

* * * * *